Patented Jan. 30, 1951

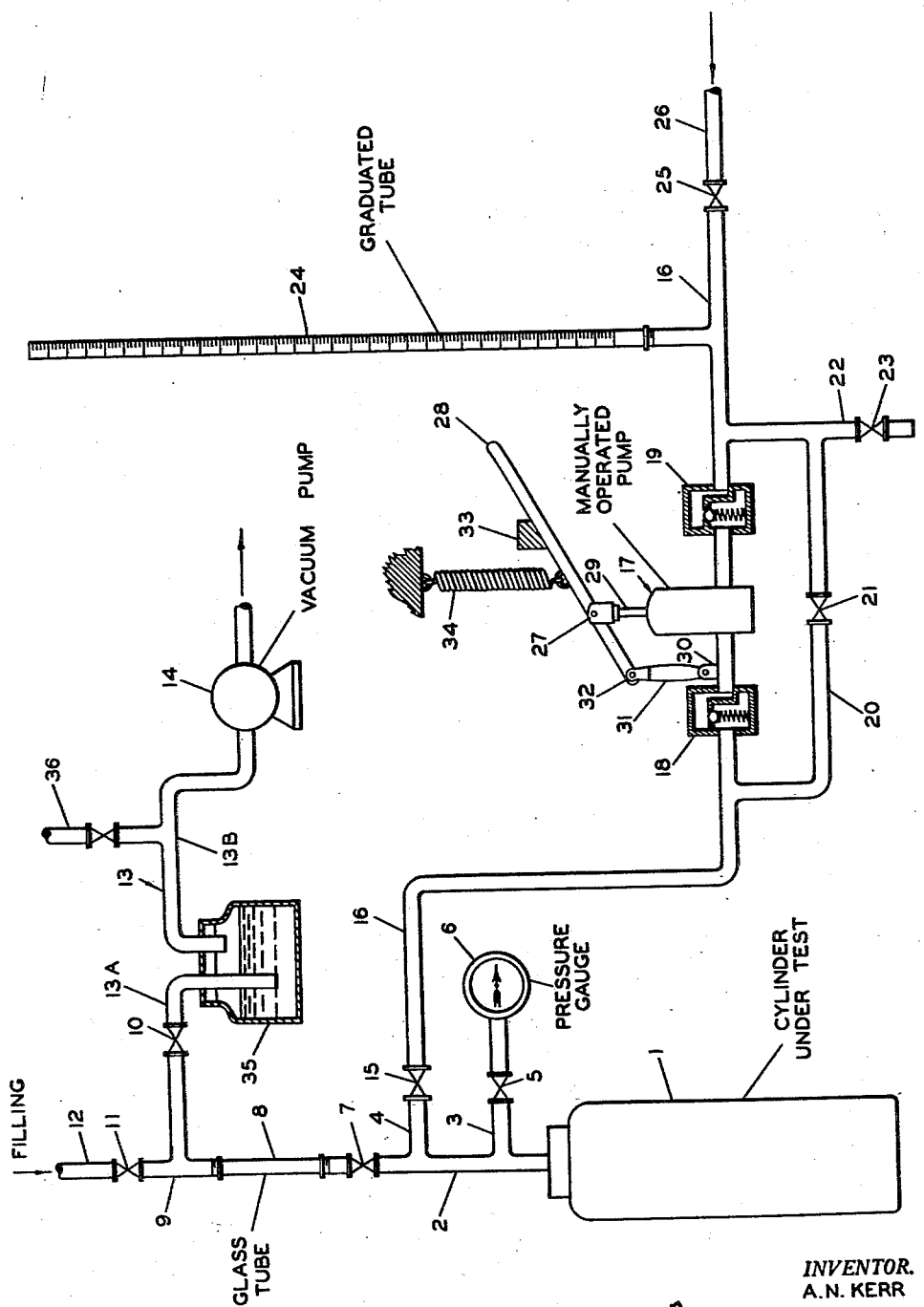

2,539,843

UNITED STATES PATENT OFFICE 2,539,843

CONTAINER TESTING DEVICE

Arthur Neal Kerr, Los Angeles, Calif., assignor to Phillips Petroleum Company, a corporation of Delaware Application April 15, 1946, Serial No. 662,107

3 Claims. (Cl. 73—37)

This invention relates to the testing of pressure vessels. In one of its more specific aspects it relates to a method and an apparatus for use in testing vessels employed in the storage and transportation of liquefied gases.

Portable pressure vessels, particularly those used for storage and transportation of liquefied gases, must be examined periodically to determine their fitness for service. Statutory regulations in many instances require testing of pressure vessels under specified pressure conditions dependent upon the original specifications. The present invention is particularly concerned with the testing of relatively small liquefied petroleum gas containers in accordance with regulations imposed by law when such containers are used in interstate commerce. It will be readily apparent, however, that the method and apparatus may be used for other vessels.

Steel, when subjected to a stress below its elastic limit, may be temporarily deformed. When the stress is relieved, the steel returns to its original shape. When a steel pressure vessel is subjected to pressure, the stress in the steel results in a slight expansion of the vessel. When the pressure is released such a vessel normally returns to its original size and shape. During a period of use, however, the pressure vessel may become dented or weakened by corrosion, or otherwise changed from its original condition to such an extent that it becomes unfit for service. When a container in weakened condition is subjected to a high pressure, the expansion in volume which it undergoes is greater than normal and the container does not return to its original volume when the pressure is released. The amount of permanent expansion offers a basis for testing the vessels or containers to determine their fitness for service. Under the present standard test conditions, the vessel to be tested is subjected to twice the working pressure for which it was originally designed and the total volume expansion measured. Then the pressure is released and the permanent expansion determined. A permanent expansion greater than 10% of the total expansion is taken as an indication that the pressure vessel is not in condition for active service.

At present there are two methods of testing in general use. The hydrostatic or water jacket method of testing is the more widely used of the two. This method consists in placing the container in a testing chamber containing water, applying pressure internally to the container, and measuring the water displacement from the testing chamber. When the pressure is applied to the container, the total expansion is determined by measuring the water displacement from the chamber into a measuring device. When the pressure is released, the quantity of water which fails to return to the chamber from the measuring device, represents the permanent expansion of the container. The testing chamber must be sealed during the test for accuracy of measurements and the chamber completely filled with water. It is evident that this method of testing, while accurate, is time consuming and not readily adaptable to testing of a number of containers varying greatly in size. A further disadvantage of the water jacket method arises from the difficulty experienced in handling the larger of the portable containers.

The direct displacement method of testing consists in filling the container with fluid, applying the test pressure, and measuring the permanent and total expansion directly from the fluid volumes. While the direct displacement method is much simpler than the water displacement method, difficulty has been experienced in accurately measuring the testing fluid under pressure.

The present invention is an improvement on the direct displacement method of testing and provides apparatus by which the testing fluid may be accurately measured at atmospheric pressure.

One object of my invention is to provide an improved method for testing pressure vessels.

Another object of my invention is to provide a portable apparatus for use in testing pressure vessels.

Still another object of my invention is to provide apparatus and a method for the use of this apparatus for accurate displacement testing of pressure vessels in which the displacement volumes are measured at atmospheric pressure.

Still other objects and advantages of my apparatus and a method for its use will be apparent to those skilled in the art from a careful study of the following disclosure and attached drawing which respectively describes and illustrates the apparatus and method of its use.

Referring to the drawing reference numeral 1 refers to a pressure cylinder or tank under test. To this pressure vessel 1 is attached a filling line 2 having two side connections 3 and 4. Side connection 3 is fitted with a valve 5 and a pressure gage 6. To the end of the filling line 2 opposite the pressure vessel 1 is attached a valve 7, thence a glass tube 8, and to this tube is fitted a T 9. Valves 10 and 11 are attached to the T as shown. The upper valve 11 is further connected with a filling tube 12, which in turn carries water, as a test liquid, from a source, not shown, to my testing apparatus. The valve 10 is connected by a pipe or tube 13 to a vacuum pump 14.

The side connection 4 carries a valve 15 to which in turn is connected a tube 16. This tube 16 carries a force pump 17, valves 18 and 19, and several side arms. To two of the side arms is attached a bypass line 20 carrying a valve 21 as shown. This bypass side arm adjacent valve 19 has an extension 22 and to the latter is attached a valve 23. To another of the side arms of tube 16 is attached a graduated glass tube 24 and to the end of tube 16 is fixed a valve 25 and an inlet tube 26.

The force pump 17 may be of any type or construction desired providing it be adapted to serve the purpose at hand. The pump, which I have used successfully, and will herein illustrate, is composed of a piston or plunger, well packed and in a housing, the entire assembly referred to by numeral 17. A plunger rod 29 is attached to a handle 28 at a pivot point 27. The handle in turn is attached to tube 16 by means of a pivot 32, a rod 31 and a pivot point 30. The pivot mechanism 30, obviously, need not especially be fixed to the tube 16, but may be attached to other supporting means, as for example, a clevis which itself may be attached to a base support, not shown, which base may be the base or support for the entire tubing-valve assembly. Further, the handle 28 may be supported or fulcrumed by any means desired, providing said support is rigid with respect to the pump mechanism 17.

In the operation of my testing device, a cylinder, bottle or tank to be tested, is attached in a leak-proof manner to the lower end of the filling tube 2. Valves 10 and 15 are closed while valves 7 and 11 are opened. A testing fluid, such as water is passed from a source, not shown, through the filling tube 12, glass tube 8 and filling line 2 into the cylinder 1. Water, from a source, not shown, enters tube 26 and is passed through tube 16 and through the bypass tube 20 to fill said tubing and associated parts with water. The pump should be operated by raising and lowering the handle 28 a sufficient number of times to make certain that the pump 17, valves 18 and 19 and connecting tubes, are free from air and filled with water. The bypass line 20 with its valve 21 should also be entirely filled with water. While filling these tubes and valves with water it may be well to open valve 15, since with this valve open the originally contained air is more easily displaced. Likewise valve 5 should also be open to permit displacement of all air in valve 5 and the pressure gage 6.

When water is run into the apparatus from tube 26, same will obviously enter the graduated tube 24, the particular amount being at this stage, immaterial.

For removal of last traces of air from the test cylinder 1 and dissolved air from the water, valves 5, 15 and 11 are closed, and valves 7 and 10 are opened. The vacuum pump 14 is then turned on to eliminate entrapped and/or the dissolved gases from the cylinder and testing fluid and thereby increase the accuracy of the test. When the entrapped and dissolved air is removed, pump 14 is shut off and valve 10 is closed.

For final water adjustment valves 11, 7, 5, 15, 21 and 25 are opened and sufficient water added through tube 26 to bring the water level at about the mid point of the glass tube 8. Since there is free flow through tubes 16 and 20 the water meniscus in the graduated tube 24 will be at about the same level as in tube 8. Valves 7, 21, 23 and 25 are closed. Valves 5 and 15 are opened and the pump handle 28 remains hooked to a tension spring 34 which holds the handle against a stop 33. Then by manually operating the pump handle the water from the graduated tube 24 passes through the valve 19, pump 17, valve 18, tube 16, valve 15 and tube 2 into the vessel being tested. This pumping is continued until the pressure shown by the pressure gage 6 has reached a predetermined test pressure, which in some cases may be about 480 pounds per square inch. When this pressure is reached the position of the water meniscus in the tube 24 is read, of course its original position had previously been observed, and the difference is the expansion of the cylinder, plus compressibility, due to an internal pressure of 480 pounds per square inch. After this latter water reading in tube 24 has been made, the valve 21 is opened and water from the cylinder under test flows back through tube 16 and bypass tube 20 into the graduated tube 24. The water level in tube 24 is again observed. The difference between the first and final readings is the amount of permanent deformation or expansion experienced by the cylinder being tested. And the difference between the first and second readings is the total deformation. This latter term, that is, "total deformation" is the sum of two values, the temporary deformation and the permanent deformation. As mentioned hereinbefore, when the permanent deformation is greater than 10% of the total deformation of a given pressure vessel, the vessel is considered not suitable for active service.

When testing a large size cylinder the tube 24 must be of such a size to furnish sufficient water for the total deformation experienced by the cylinder. Likewise when a small cylinder is being tested the graduated tube may be small and by having a small diameter the volume readings may be more accurately made.

After the apparatus has been filled with water and one or more tests completed, to make another test, it is merely necessary to close valves 5, 15 and 7, and replace the tested cylinder 1 by another cylinder to be tested. The water of course is poured from the tested cylinder and the cylinder dried by any means or method desired.

After a cylinder to be tested is attached to the lower end of the filling line 2, valves 7 and 11 are opened and water added. The vacuum is then applied to remove entrained and dissolved air as hereinbefore mentioned.

As an alternative method of filling a cylinder with water, the cylinder may be filled with water from a hand hose prior to coupling the drum to the bottom of the filling line 2. I have found that this latter procedure expedites testing considerably and is especially advantageous when a large number of drums are to be tested.

The check valves 18 and 19 may be of any type desired provided they serve the purpose at hand. I have shown them as being spring operated ball checks merely as examples.

The force pump 17, likewise, may be any type of pump desired, provided it is suitable for pumping small volumes of water or other liquid used in this test work at relatively high pressures. The pump used should be substantially leak-proof since any water which leaks past the piston will be included in the total expansion as well as in the permanent expansion of the cylinder being tested. One type of pump found satisfactory contains a lantern gland replacing about the center packing ring. The pump housing adjacent this lantern gland is drilled and the hole threaded and a small tube connects this hole with the tube 16 at a point upstream of the ball check valve 19. In this manner any water leakage past the first several packing rings may flow by way of the lantern gland and tube into the water line 16 at a point of low pressure.

In case the test cylinder 1 is relatively small the vacuum line 13 may pass directly from the valve 10 to the vacuum pump 14. However, if the test cylinder is large then a heavy walled glass bottle 35 may be inserted in the vacuum tube 13 as shown. This bottle is about ⅔ or so filled with the testing liquid, for example water. With one end of the vacuum tube 13a dipping in the water as shown, when the vacuum is applied the air released from the tank 1 and from the testing liquid, will pass through the dipping tube into the water in the bottle 35 and out tube 13b to the vacuum pump 14. Upon disconnection of the vacuum pump, water will pass from the bottle through tube 13 into the vertical column 9, 8 and 2 and finally into the cylinder 1 under test to satisfy expansion due to release of vacuum. In this manner water only is permitted to refill the test cylinder 1. A side tube 36 carrying a valve is for use in admission of air for following evacuation.

It is not intended that my test method and apparatus be limited to the use of water as a testing fluid since other liquids may be used. I have used kerosene and paint thinner in addition to water as test liquids. When using water and kerosene or other non-volatile liquid, care must be exercised in making certain that all test liquid is removed from the cylinder after completion of the test. A heater for providing hot air for blowing of the cylinders may be necessary for water or kerosene. The latter being somewhat oily and of none too pleasant odor may be objectionable on this basis.

I have used such a liquid as a volatile paint thinner. Liquids of this type are ordinarily not unpleasantly odorous, and are usually sufficiently volatile that a stream of air blown into the cylinders rapidly evaporates final traces of the liquid. Such volatile liquids are accordingly advantageous for my purpose, however, they are not without disadvantage. When using such liquids, say with a portable test set, the test liquid must be carried along with the apparatus.

By weighing advantages against disadvantages, I prefer to use water as the test liquid.

Since liquids are somewhat compressible at high pressures, it might be well to correct an observed reading for the compressibility of water at the test pressure. When so doing, the approximate volume of the test cylinder and tube 16 and accompanying parts exposed to high water pressure should be known.

Likewise the material of construction of the tube 16 and accompanying parts should be such as not to expand under test pressures. Ordinary high pressure tubes and fittings will be satisfactory.

By the term high pressure, is meant such pressures as of the order of from about 200 to 250 pounds per square inch. However, the pressure required for the storage of any liquefied gas will of course be dependent upon the nature of the gas. To store some gases, such as butane, does not require very high pressures, as for example, the vapor pressure of butane at 100° F. is about 50 pounds per square inch. At the same temperature, a pressure of nearly 200 pounds per square inch is required for propane.

It will be obvious to those skilled in the art that many variations and alterations of my process and apparatus may be made and yet remain within the intended spirit and scope of my invention.

Having described my invention, I claim:

1. Apparatus for the hydrostatic testing of pressure vessels comprising a test liquid reservoir graduated for observation of liquid level therein, a first conduit leading from said reservoir to a vessel to be tested, a pressure producing means disposed in said conduit and in fluid communication therewith, a vacuum producing means adapted to be in communication with or closed off from said vessel to be tested, a first check valve disposed in said conduit and intermediate said graduated reservoir and said pressure producing means, a second check valve in said conduit and intermediate said pressure producing means and the vessel to be tested, said check valves being so oriented as to permit flow of fluid in the direction from the graduated liquid reservoir to the vessel to be tested; a second conduit, one end of which is in fluid communication with the first conduit at a point intermediate said graduated reservoir and the first check valve, the other end of said second conduit being in fluid communication with said first conduit at a point intermediate said second check valve and the vessel to be tested, and a valve in said second conduit.

2. Apparatus for the hydrostatic testing of pressure vessels comprising a test liquid reservoir graduated for observation of liquid level therein, a valved line for supplying test liquid to said reservoir, a first conduit leading from said reservoir to a vessel to be tested, a pressure producing means disposed in said conduit and in fluid communication therewith, a first check valve disposed in said conduit and intermediate said graduated reservoir and said pressure producing means, a second check valve in said conduit and intermediate said pressure producing means and the vessel to be tested, said check valves being so oriented as to permit flow of fluid in the direction from the graduated liquid reservoir to the vessel to be tested; a second conduit, one end of which is in fluid communication with the first conduit at a point intermediate said graduated reservoir and the first check valve, the other end of said second conduit being in fluid communication with said first conduit at a point intermediate said second check valve and the vessel to be tested, and a valve in said second conduit.

3. Apparatus for the hydrostatic testing of pressure vessels comprising a test liquid reservoir graduated for observation of liquid level therein, a first conduit leading from said reservoir to a vessel to be tested, a pressure producing means disposed in said conduit and in fluid communication therewith, vacuum producing means including a vacuum pump, a vessel partially filled with liquid, a line having one end thereof submerged in the liquid within said vessel and its other end communicating with the vessel to be tested, a valve in said line, and a pipe connecting said vacuum pump to the interior of said vessel above the liquid level therein, said vacuum producing means being adapted to remove air inadvertently entrained by the test liquid in the test vessel, a first check valve disposed in said conduit and intermediate said graduated reservoir and said pressure producing means, a second check valve in said conduit and intermediate said pressure producing means and the vessel to be tested, said check valves being so oriented as to permit flow of fluid in the direction from the graduated liquid reservoir to the vessel to be tested, a second conduit, one end of which is in fluid communication with the first conduit at a point intermediate said graduated reservoir and the first check valve, the other end of said second conduit being in fluid communication with said first conduit at a point intermediate said second check valve and the vessel to be tested, and a valve in said second conduit.

ARTHUR NEAL KERR.

REFERENCES CITED

The following references are of record in the file of this patent:

UNITED STATES PATENTS

| Number | Name | Date |
|---|---|---|
| 1,613,150 | Zore | Jan. 4, 1927 |
| 1,811,138 | Lassman | June 23, 1931 |
| 2,353,275 | St. Clair | July 11, 1944 |
| 2,392,636 | Boehler | Jan. 8, 1946 |

FOREIGN PATENTS

| Number | Country | Date |
|---|---|---|
| 404,107 | Great Britain | Jan. 11, 1934 |